United States Patent
Gregory

(10) Patent No.: US 7,758,090 B2
(45) Date of Patent: Jul. 20, 2010

(54) AUTOMOBILE FRONT SEAT GAP BLOCKER

(76) Inventor: Russell Gregory, 1627 Gerundecut, West Bloomfield, MI (US) 48324

(*) Notice: Subject to any disclaimer, the term of this patent is extended or adjusted under 35 U.S.C. 154(b) by 0 days.

(21) Appl. No.: 12/397,875

(22) Filed: Mar. 4, 2009

(65) Prior Publication Data
US 2009/0224563 A1    Sep. 10, 2009

Related U.S. Application Data

(60) Provisional application No. 61/033,542, filed on Mar. 4, 2008.

(51) Int. Cl.
*B60J 9/00* (2006.01)
(52) U.S. Cl. .......... 296/1.07; 296/63; 297/182
(58) Field of Classification Search ............. 296/24.34, 296/67, 63, 1.07, 1.09; 224/275, 543, 544, 224/539, 542; 297/182
See application file for complete search history.

(56) References Cited

U.S. PATENT DOCUMENTS

| 2,836,229 | A | * | 5/1958 | Spetner ............. 297/182 |
| 4,948,195 | A | | 8/1990 | Saunders |
| 5,887,941 | A | | 3/1999 | Kopinski et al. |
| 6,022,072 | A | * | 2/2000 | Moyer ............. 297/182 |
| 6,726,267 | B2 | * | 4/2004 | Kim et al. ........... 296/24.34 |
| 2007/0241581 | A1 | | 10/2007 | Martin |
| 2008/0283565 | A1 | | 11/2008 | Simon et al. |
| 2009/0091165 | A1 | * | 4/2009 | Thompson ........... 297/228.12 |

\* cited by examiner

*Primary Examiner*—Jason S Morrow
(74) *Attorney, Agent, or Firm*—Gifford, Krass, Sprinkle, Anderson & Citkowski, P.C.

(57) ABSTRACT

An elastomeric blocker adapted to be inserted between the adjacent surfaces of a front seat of an automobile and a central console of an automobile to block the gap between the seat and the console and prevent articles from accumulating in the gap. The block has a central slit extending between its top and the bottom aligned longitudinally for the reception of the side seatbelt. A smooth sheet surface coating of fabric or plastic is attached to the section of the elastomer which contacts the central console, so that the blocker slides with the seat as it moves forwardly and rearwardly.

6 Claims, 3 Drawing Sheets

AUTOMOBILE FRONT SEAT GAP BLOCKER

CROSS-REFERENCE TO RELATED APPLICATIONS

This application claims priority of U.S. Provisional Patent Application Ser. No. 61/033,542 filed Mar. 4, 2008, which is incorporated herein by reference.

FIELD OF THE INVENTION

This invention relates to an elastomeric device adapted to fit into the gap between a front seat and the central console of an automobile to prevent objects from falling into the gap and onto the vehicle floor, while providing a vertical channel through which the seatbelt may extend.

BACKGROUND OF THE INVENTION

Most modern automobiles and light trucks have a central console disposed between the driver's seat and the front passenger seat. The adjacent edges of the seats and the console are spaced from one another to allow the seats to be adjusted forwardly or rearwardly. Small objects which may have been placed on top of the console or fall from a pocket tend to fall into the gap and land on the vehicle floor, and the narrow dimensions of the gap make it difficult to retrieve these objects.

This problem often annoys drivers and several solutions have been proposed. U.S. Pat. No. 5,887,941 discloses a removable receptacle placed longitudinally on the automobile floor underlying the gap between the driver's seat and the console to collect objects which drop through the gap. U.S. Pat. No. 4,948,195 discloses a cardboard box of approximately the size of the gap having accordion pleated sides so that it may be adjusted in width to fit within the gap and block it. U.S. Patent Application 2007/0241581 discloses a block of resiliently deformable material that has dimensions slightly greater than the gap and may be compressed so as to fit within the gap. None of these devices is believed to have enjoyed commercial success. First, they do not make any provision for the side seatbelts which are necessarily anchored to the side of the seat in the gap between the seat and the console and must extend upwardly through the gap. U.S. Patent Application 2007/0241581 proposes that the seatbelt extend between the resilient blocker and the driver's seat. This limits the adjustability of the driver's seatbelt in a manner that is often unacceptable, and provides inadequate coverage around the seatbelt stem. Moreover, none of these devices considers the necessary fore and aft adjustment required of the driver's seat, which tends to deform and distort the devices of these previous designs.

SUMMARY OF THE INVENTION

The present invention is accordingly directed toward an automobile front seat gap blocker formed of a resilient material and incorporating a vertically extending, longitudinally aligned slit passing from its bottom to its top. The slit has sufficient longitudinal extent to allow the section of the seatbelt which extends through the slit to do so easily, however fore or aft said section may be positioned. The resiliency of the blocker allows the buckle on the free end of the seatbelt section to be passed through the slit and close against the sides of the belt so that no gap is present in which objects might accumulate. Additionally, to facilitate the necessary longitudinal adjustment of the seat, the sides of the blocker that abuts against the console, is provided with a relatively smooth coating, which may be in the form of either a plastic or fabric adhered to the portion of the blocker which bears against the console. This sliding surface may bear a label. The blocker thus moves fore and aft with the seat as it's adjusted, and sliding along to the console.

In the preferred embodiment of the invention, which will subsequently be described in detail, it is also coated on the top and bottom, preferably with a screen printing technique, to allow for easy cleaning and an aesthetic appeal of the device.

BRIEF DESCRIPTION OF THE DRAWINGS

Other objectives, advantages and applications of the present invention will be made apparent by review of the following detailed description of the preferred embodiment of the invention. The description makes reference to the accompany drawings in which.

DETAILED DESCRIPTION OF THE INVENTION

Figure 1:
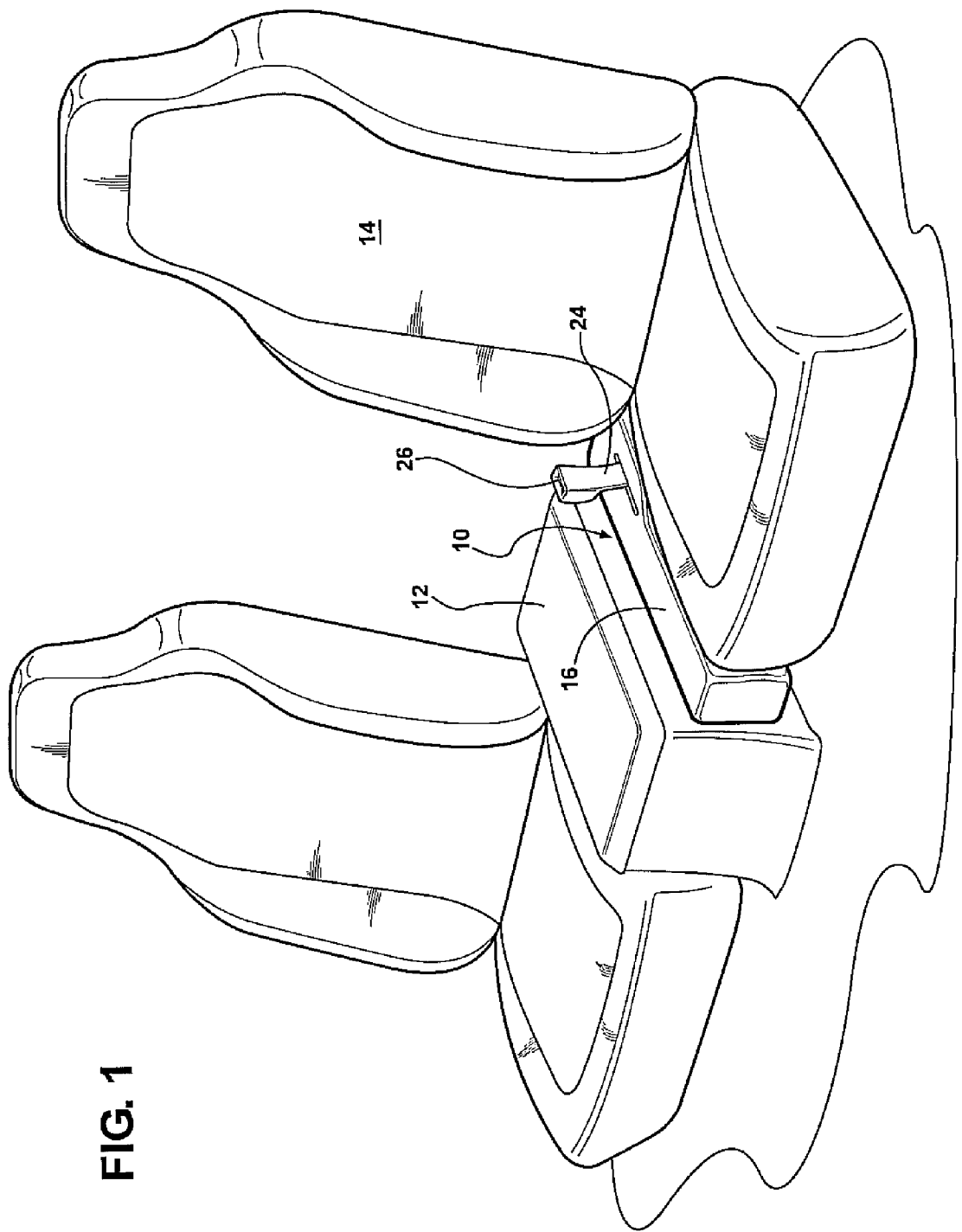
FIG. 1 is a perspective view of a pair of vehicle front seats with a central console disposed between the seats and the gap blocker of the present invention disposed between the central console and the adjacent side of the driver's seat.
Figure 2:
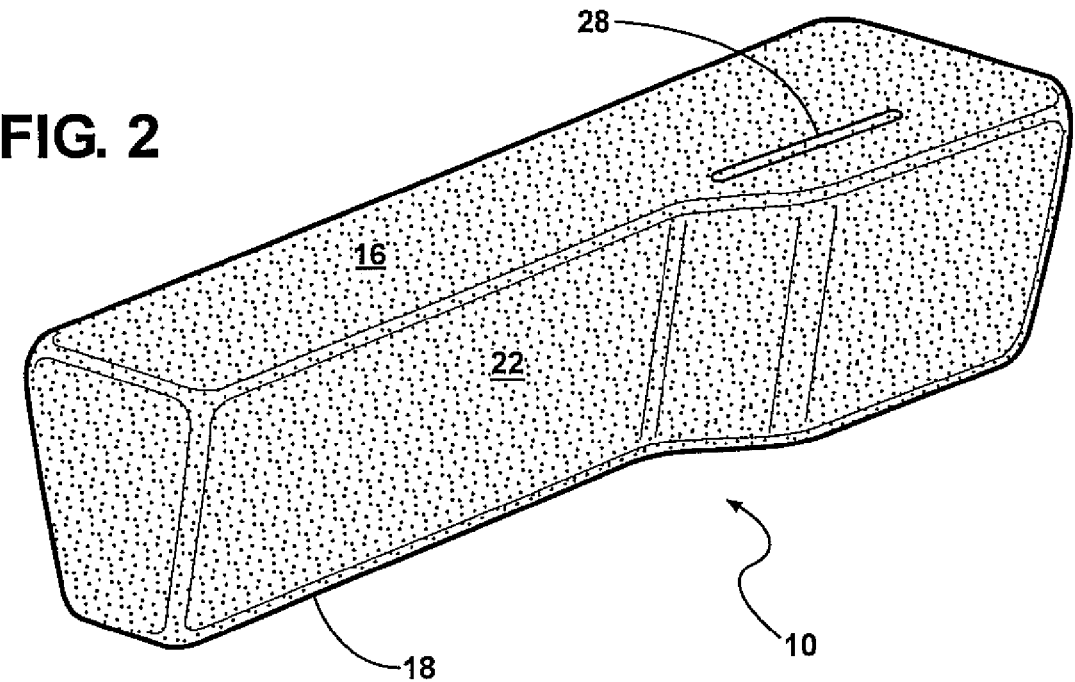
FIG. 2 is a perspective view of the gap blocker of the present invention from the top and the side of the blocker which bears against the driver's seat.
Figure 3:
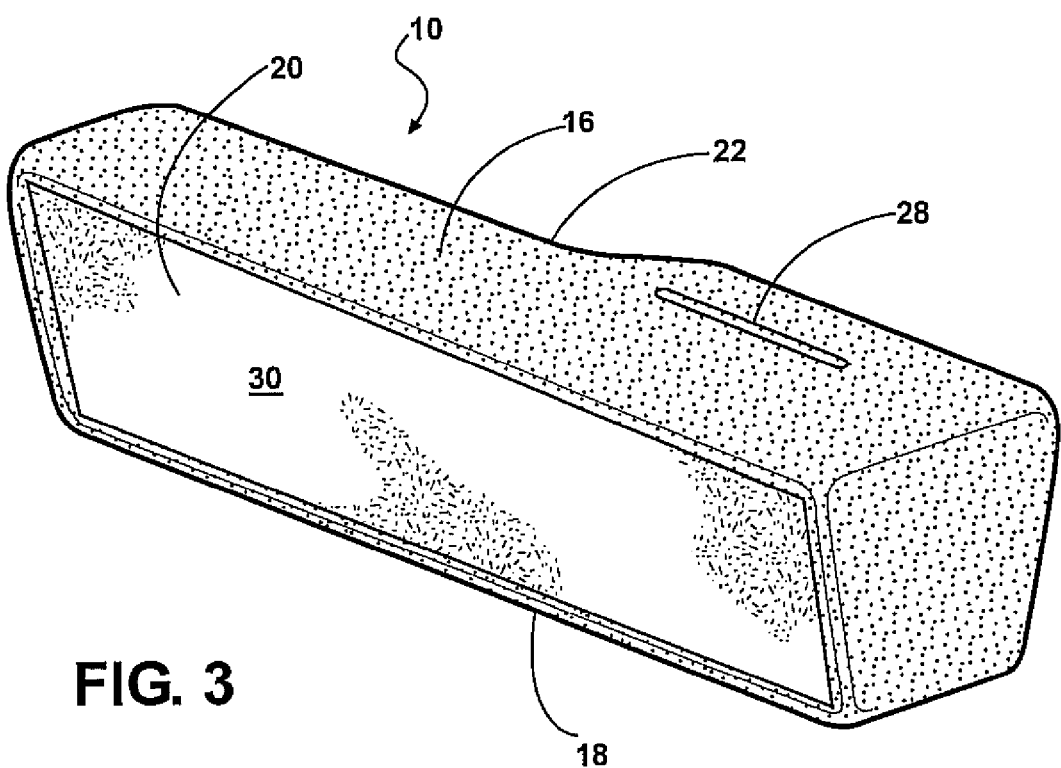
FIG. 3 is a perspective view of the gap blocker of the present invention from the top and the side that bears against the central console.

The gap blocker of the present invention, generally indicated at 10 in the drawings, constitutes a resilient elastomeric body having a durometer on the Shore A scale of less than 50, and preferably in the range of 40, making it relatively compressible. The main body of the blocker 10 is preferably molded from polyurethane foam.

The blocker 10 is intended to be disposed between a central console 12 of an automotive vehicle with one side abutting the interior side of the driver's seat 14 and the other side abutting the adjacent side of the central console 12.

However, the blocker is equally useful for insertion between the front passenger seat and the console. The blocker has a relatively flat top surface 16, a bottom surface 18 generally parallel to the top surface, a console side surface 20 which is relatively flat along the length of the blocker 10, and a driver's seat side 22. The blocker has a forward section in which the width of the device between the side walls 20 and 22 is relatively narrow and a thicker rear end section. This accommodates a typical curve in the driver's side seat intended to allow a seatbelt 24, which has one end anchored to the side of the seat and a buckle member 26 at its upper end, to extend between the adjacent surfaces of the central console and the driver's seat. In other embodiments of the invention the blocker 10 could be of a constant width along its entire length, for use with seats which do not have a rear end recess to accommodate the seatbelt. While the blocker is shown in the drawings as a wedge shape, that is narrower at the bottom than the top, in other embodiments it could be of constant width along its height.

A longitudinally extending slit 28 is formed between the top 16 and the bottom 18 of the blocker. The slit extends vertically, normal to the top 16 and the bottom 18. The slit allows the seatbelt section 24 to be passed through the blocker, from the bottom section 18 to the top 16. The resilience of the elastomer from which the blocker is formed allows the buckle end to pass through the slit, which then closes over the belt section 24.

The uncompressed thickness of the blocker 10 between the walls 20 and 22 is preferably slightly greater than the width of the gap between the seat and the central console. Thus, in installing the blocker 10 between the seat and the console it is necessary to slightly compress the blocker and the blocker then presses against the console and the adjacent side of the driver's seat.

Figure 4:
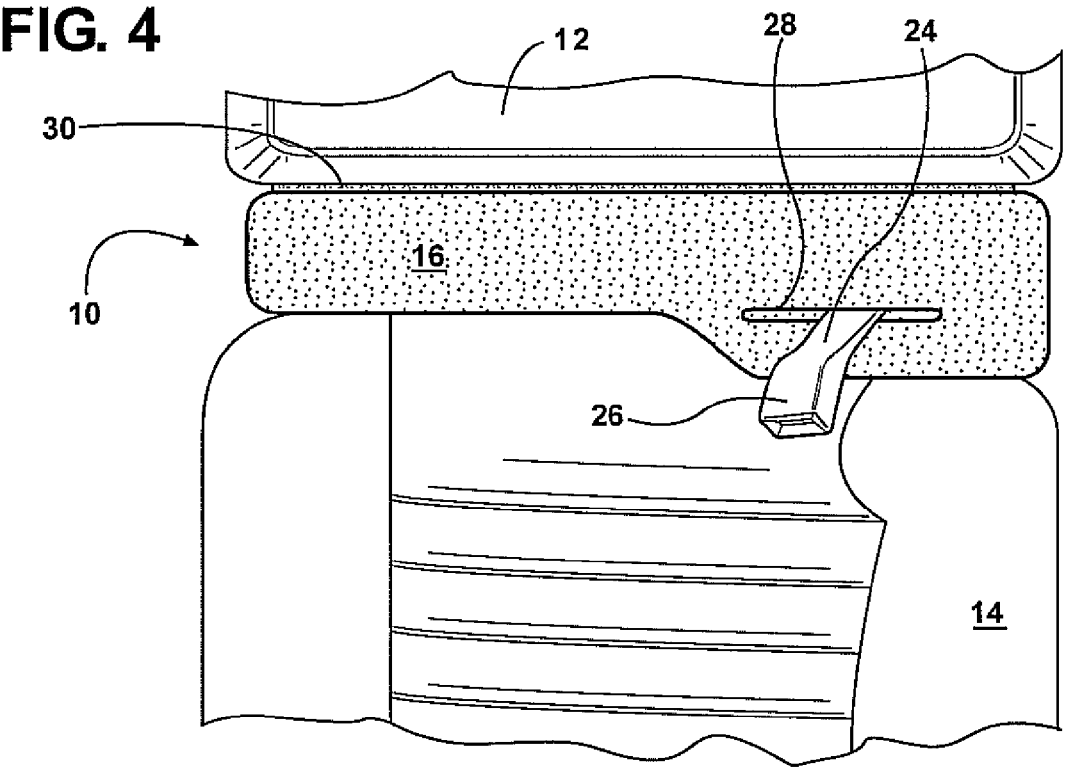
FIG. 4 is a top view, broken away, illustrating the gap blocker of the present invention disposed between a driver's seat and the adjacent side of a central console, with the driver's seat in a generally rearwardly retracted position.
Figure 5:
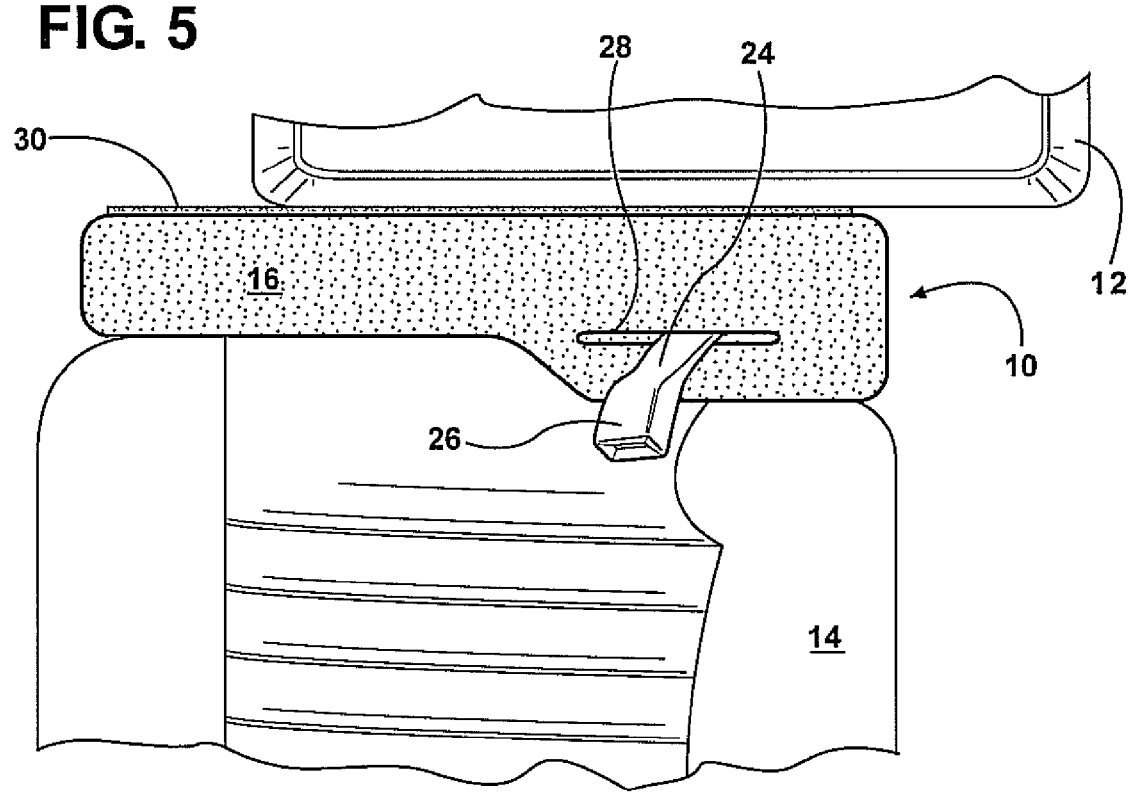
FIG. 5 is a top view of the blocker of the present invention disposed between the driver's seat and the adjacent side of the central console, with the driver's seat extended forwardly relative to the position in FIG. 4.

The side 20 of the blocker 10 which is adapted to bear against the console 12 has a treatment or a coating 30, which is relatively smooth compared to the untreated/uncoated surface of the blocker 10. The coating may be in the form of a fabric and may be imprinted with typical label information. Alternatively, the sheet 30 could be formed of a thin sheet of plastic with a smooth finish. The smooth finish of the coated sheet 30 allows the blocker 10 to slide relative to the central console as the driver's seat is adjusted forwardly or rearwardly. The driver's seat side of the blocker, formed of the elastomer or otherwise less slick than the console side, tends to cling to the seat. Accordingly, when the seat 14 is moved from a rearward position, as illustrated in FIG. 4, to a forward position, as illustrated in FIG. 5, to accommodate the driver, the blocker 10 tends to move with the driver's seat and slide over the console. The length of the slit allows the seatbelt 24 to fit easily through it.

The other surfaces of the blocker, such as the top surface, the bottom and the end surfaces, may be decoratively coated with paint or the like to achieve an aesthetic design.

Having thus described my invention, I claim:

1. A block of resilient elastomeric material adapted to be disposed in an automotive vehicle between a front seat and a central console of the vehicle, the block having a generally flat top, a generally flat bottom, and a pair of opposed sides which are adapted to extent longitudinally relative to the vehicle, a first uncovered side adapted to abut the seat and a second side adapted to abut the central console, the second side having an outer surface covering which is relatively smooth compared to the uncovered surface of the block so that the block is adapted to slide along the central console during longitudinal motion of the driver's seat; and a central slit extending between the bottom and top of the block in a generally vertical attitude normal to both the bottom and the top, the slit being aligned longitudinally when placed in the vehicle and adapted to receive a side seatbelt having one end anchored to the side of the seat and the other end supporting a buckle section.

2. The block of claim 1 wherein the block has a forward section which is relatively narrow, and a rearward section which is relatively wide, with an inclined transition section between the two, and said central slit is formed through the rearward section.

3. The block of claim 1 wherein the second side that contacts the central console is relatively flat and the first side that contacts the driver's seat has a relatively narrow forward section and a thicker rearward section.

4. A gap blocker for use in an automotive vehicle having a central console extending alongside the driver's seat, with a gap between the console and the driver's seat, comprising:

a resilient block formed of polyurethane foam having unstressed dimensions wider than the gap and having a first flat side adapted to contact the side of the central console opposite to the driver's seat, said first side being covered by a smooth sheet layer or otherwise treated to increase slickness relative to the foam block;

a second uncovered side of the block adapted to contact the side of the driver's seat opposed to the console, the block having a forward section with a first width, and a rear section with a greater width than the first width; and an elongated slit extending from the top of the blacker to the bottom of the blocker, being aligned longitudinally of the vehicle, and adapted to receive a driver's side seatbelt having one end anchored to the side of the seat and a buckle section attached to the free end, which buckle section is adapted to pass through the slit from the bottom of the block to the top of the block, so that the buckle section is engageable from above the block;

whereby, the blocker will tend to move with the seat and slide over the console during longitudinal movement.

5. The gap blocker of claim 4 wherein the smooth sheet layer on the first side of the block, which contacts the central console, is fabric.

6. The gap blocker of claim 4 wherein the smooth sheet layer that covers the first side of the blocker which contacts the central console is formed of plastic.

* * * * *